(12) United States Patent
Hashimoto

(10) Patent No.: US 6,861,776 B2
(45) Date of Patent: Mar. 1, 2005

(54) STATOR STRUCTURE OF MOTOR

(75) Inventor: Katsuo Hashimoto, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 10/460,057

(22) Filed: Jun. 12, 2003

(65) Prior Publication Data
US 2004/0056544 A1 Mar. 25, 2004

(30) Foreign Application Priority Data

Jun. 13, 2002 (JP) .......................... 2002-172350
Nov. 14, 2002 (JP) .......................... 2002-330271

(51) Int. Cl.⁷ .................................. H02K 15/00
(52) U.S. Cl. ...................... 310/71; 310/89; 29/596; 439/884
(58) Field of Search ................. 310/71, 68 R, 310/43, 89; 29/596; 439/884

(56) References Cited

U.S. PATENT DOCUMENTS

| | | | |
|---|---|---|---|
| 4,182,026 A | * 1/1980 | Searle | 29/596 |
| 4,818,911 A | * 4/1989 | Taguchi et al. | 310/259 |
| 5,057,732 A | * 10/1991 | Fukaya | 310/208 |
| 5,313,125 A | * 5/1994 | Bosman et al. | 310/49 R |
| 5,334,897 A | * 8/1994 | Ineson et al. | 310/89 |
| 6,577,031 B2 | * 6/2003 | Morooka et al. | 310/68 R |
| 6,672,915 B2 | * 1/2004 | Noritake | 439/884 |

FOREIGN PATENT DOCUMENTS

| | | | | |
|---|---|---|---|---|
| EP | 519163 A1 | * 12/1992 | | H02K/5/22 |
| JP | 036299750 A | * 12/1988 | | |
| JP | 63299741 A | * 12/1988 | | H02K/15/02 |
| JP | 11118061 A | * 4/1999 | | F16K/31/06 |
| JP | 2000-224798 | 8/2000 | | |
| JP | 2001-008396 | 1/2001 | | |
| JP | 2001-086684 | 3/2001 | | |

* cited by examiner

Primary Examiner—Joseph Waks
(74) Attorney, Agent, or Firm—Hogan & Hartson, LLP

(57) ABSTRACT

A stator structure of a motor includes a stator assembly having a coil bobbin on which coil windings are wound, terminal pins affixed to the coil bobbin, a substrate having a wiring pattern and affixed to the terminal pins, and a connector member that is equipped with connector pins for supplying external power. The connector member is provided independently of the terminal pins. The connector pins of the connector member are electrically connected through the wiring pattern on the substrate to the terminal pins. At least a connection section between the substrate and the terminal pins, a connection section between the substrate and the connector pins, and a part of the connector member are sealed with sealing resin.

21 Claims, 16 Drawing Sheets

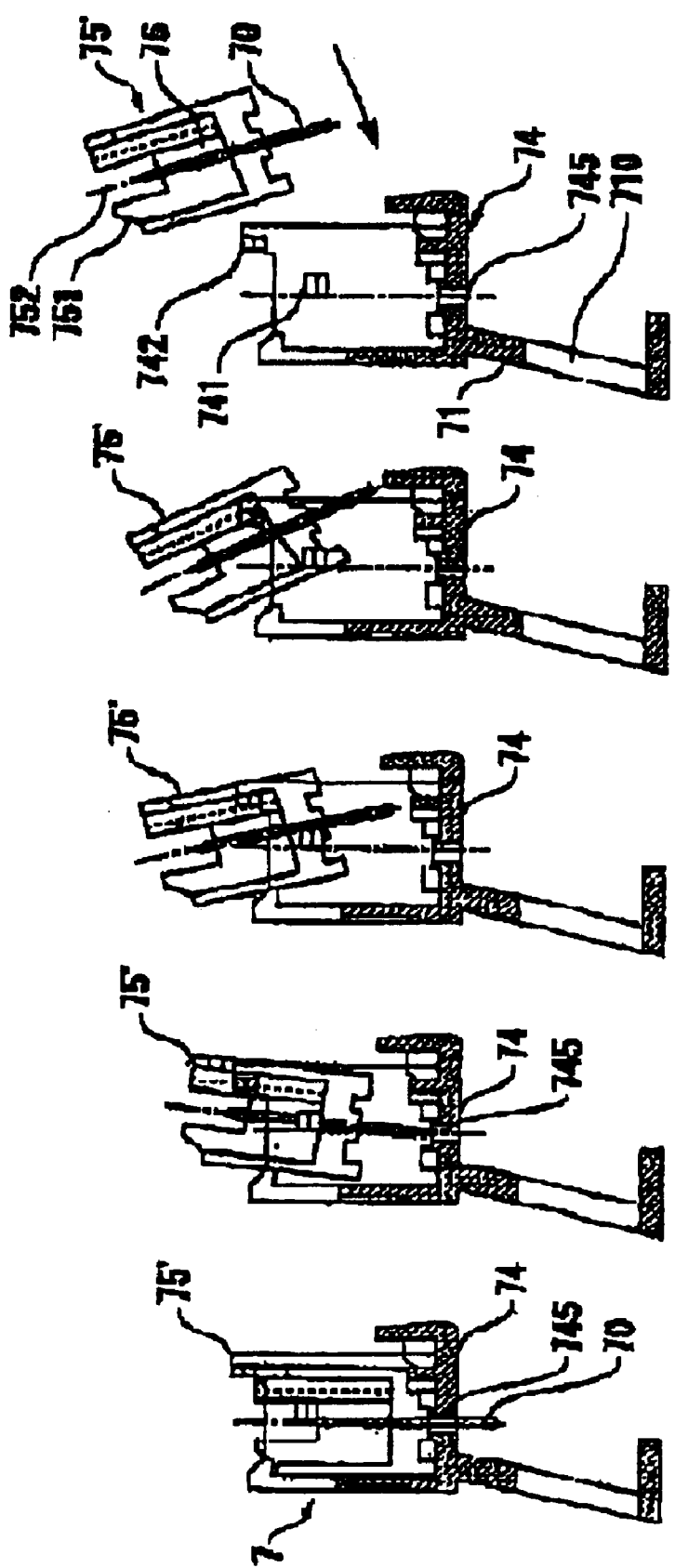

STATOR STRUCTURE OF MOTOR

BACKGROUND OF THE INVENTION

1. Field of the Invention

The present invention relates to stator structures of motors.

2. Related Background Art

Stepping motors are used in a variety of outdoor equipments such as air conditions. A stepping motor in an air conditioner may be used to drive a flow adjusting valve to adjust the flow amount of refrigerant. The stepping motor of this type is equipped with coil windings and terminal pins connected to the coils windings. Generally, ends of the coil windings are wound on the terminal pins. A power supply line with a connector is connected to the terminal pins for supplying power to the coil windings. This type of stopping motor, which is normally installed outside, needs to be water-resistant, and is provided with a water-resistant structure that seals the section where the coil windings are wound on the terminal pins.

However, connectors that are to be connected to the terminal pins may often vary in size and structure depending on different motor equipment manufacturers. This entails problems. For example, the design of terminal pins of motors may have to be changed for each of the connectors that may have different structures and sizes.

Also, end sections of terminal pins to which a connector is connected need a high-measurement accuracy. If coils of a motor are wound on the terminal pins, and dipped in a solder dip tank or processed by an automatic soldering apparatus for solder-bonding the coils and the terminal pins, the solder may adhere to end sections of the terminal pins, which may deteriorate the measurement accuracy. Therefore, the soldering work at the terminal pins needs to be manually conducted to maintain the measurement accuracy.

Moreover, when terminal pins with coil windings wound on them are used for connecting the coil windings to a connector, the terminal pins need to be substantially long, and therefore bents and dents would likely occur in the terminal pins. Also, the long terminal pins may cause other problems. For example, when inserting an assembly of coil windings with the long terminal pins in a metal mold for resin molding, when injecting resin in the metal molding (potting), or when press-fitting coil bobbins, the terminal pins become obstacles.

When a connector housing is made of resin that makes up coil bobbins or sealing resin, and the connector housing is used as a female connector, it is very difficult, in terms of the use of a metal mold, to form a locking structure in the connector housing for connecting to a male connector member. For this reason, the locking structure may end up in having a simple structure, and the connector with the simple locking structure would often fail. Also, when hard resin is used as the sealing resin, coil windings would likely be broken off. On the other hand, when soft resin is used, the lock mechanism for connecting to a male connector member cannot be formed with a sufficient strength.

SUMMARY OF THE INVENTION

In view of the above, the present invention relates to stator structures of motors that can provide a connection structure that uses a connector without elongating terminal pins, that facilitates automatic soldering on terminal pins and reliable formation of lock mechanisms, and that can readily accommodate changes in size and shape of connector pins without having to change the design of motors.

In accordance with an embodiment of the present invention, a stator structure of a motor include a stator assembly having a coil bobbin on which coil windings are wound, terminal pins affixed to the stator assembly having a coil bobbin, a substrate that is affixed to the terminal pins, the substrate having a wiring pattern, and a connector member that is equipped with connector pins for supplying external power, the connector pins being electrically connected through the wiring pattern on the substrate to the terminal pins. In one aspect, at least a connection section between the substrate and the terminal pins, a connection section between the substrate and the connector pins, and a part of the connector member are sealed with sealing resin.

As a result, when the connector pins differ in size and structure for each of the manufacturers, only the connector pins need to be changed, and the design of the terminal pins and stator assembly having a coil bobbin does not have to be changed. Also, the connector pins that are provided independently from the terminal pins provide the following advantage. When coil windings are wound on the terminal pins, and the terminal pins are still separated from the connector pins, the terminal pins can be soldered to the coil windings in a solder dip tank or by an automatic soldering apparatus. Accordingly, the solder would not adhere to the connector pins and the measurement accuracy would not lower. For this reason, the soldering work on the terminal pins can be automated. Furthermore, due to the fact that the stator structure in accordance with the present embodiment is equipped with the connector pins that are provided independently of the terminal pins, the terminal pins can be short. Accordingly, no bent or dent occurs in the terminal pins. Further, when inserting an assembly of coil windings with the terminal pins in a metal mold for resin molding, injecting resin in the metal molding (potting), or press-fitting a stator assembly having a coil bobbin, the terminal pins do not become obstacles. Furthermore, due to the fact that the stator structure is provided with the connector member, a connector housing or the like does not have to be formed with resin that composes a coil bobbin or sealing resin, and therefore a strong and high performance lock mechanism can be provided to the stator structure.

In one aspect, at least one through hole may preferably be provided in the substrate for filling sealing resin. As a result, sealing resin provided on both sides of the substrate can readily be connected through the through hole, and therefore the sealing resin can be securely injected and filled in every corners.

In another aspect, the connector member may preferably be a female connector member that is equipped with a connector housing formed with a recessed section that receives a male connector member. The connector housing may preferably be equipped with an embedding section that extends in the opposite direction of the side of the recessed section and is embedded in the sealing resin. As a result, the connector member is securely retained by the sealing resin through the embedding section.

In one aspect, the connector housing may preferably be equipped with a female connector that is affixed to the connector pins at a bottom section of the recessed section and a connector holder that retains the female connector, and the embedding section may preferably be formed in the connector holder. As a result, a general purpose product may be used as the female connector. Accordingly, the female connector can be replaced with a different one if required according to the specification, and a general purpose male connector can be used as is for the general purpose female connector, such that the stator structure in accordance with the present embodiment is highly reliable in securely providing the required connection strength.

In one aspect, the boundary surface of the sealing resin may be located between the embedding section and the recessed section, for example.

In one aspect, at least one through hole may preferably be provided in the embedding section. As a result, sealing resin provided on both sides of the embedding section can be connected through the through hole, and therefore the sealing resin can be securely injected and filled in every corners. Also, the connector member can be securely retained by the sealing resin through the embedding section.

In accordance with the present embodiment, the connector housing may preferably be equipped with a dam section between the embedding section side and the recessed section side, which prevents the sealing resin from flowing into the recessed section. As a result, the sealing resin does not flow into the recessed section in which the male connection member is inserted, such that the connector members can be securely connected to each other.

In one aspect, the connector housing may preferably be equipped with an engagement section that engages with the substrate. As a result, the connector housing can be securely positioned with respect to the substrate.

The stator housing in accordance with the present embodiment may preferably include a cover (or a case) that is equipped with a bobbin storing section where the stator assembly having a coil bobbin is stored and disposed. The cover may preferably be equipped at least with a resin filling section at a position adjacent to the bobbin storing section, wherein the resin filling section is filled with the sealing resin in a state in which the cover stores at least a part of the substrate and the connector member. As a result, by merely injecting the sealing resin inside the resin filling section, the circumference of the substrate can be securely sealed, and the connector member can be securely retained by the sealing resin.

In one aspect, the cover may preferably be equipped with a connector protection section that extends from the resin filling section in a manner to encircle the connector housing. As a result, the connectors can be prevented from being disengaged even when some object may hit the connection section between the connectors. Also, when the connection section between the connectors is disposed facing downward, water such as rain water cannot fall on the connection section.

When the stator housing includes the cover having the bobbin storing section where the stator assembly having a coil bobbin is stored and disposed, and the cover is equipped the resin filling section at a position adjacent to the bobbin storing section in a manner that the resin filling section is filled with the sealing resin in a state where the cover stores at least a part of the substrate and the connector member, the resin filling section and the connector member may preferably be provided with a positioning mechanism that fixes the connector member at a predetermined position within the resin filling section. As a result, the resin sealing work can be conducted while the connector member is temporarily fixed at the predetermined position within the resin filling section. Accordingly, the substrate does not need to position the connector member, and therefore a flexible wiring substrate can be used as the substrate.

In one aspect, the resin filling section of the cover may preferably be formed in a manner to protrude to the side of the bobbin storing section and have an upper surface that defines an opening section, and the connector member may be affixed to the side of the opening section of the resin filling section. By filling the sealing resin in the resin filling section, a lower side of the connector member and the side of the bobbin storing section can be sealed by the sealing resin.

In this case, the cover may preferably be provided with a connector protection section extending upward from the resin filling section and having a generally U shape cross section as viewed in plane.

Also, the connector member may preferably be equipped with a connector housing having a recessed section formed therein in which one of the male connector member and the female connector member is inserted, and the connector housing may preferably be equipped with an embedding section that extends in an opposite direction of the recessed section and embedded by the sealing resin.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 17 (A), 17 (B), 17 (C), 17 (D) and 17 (E) show cross-sectional views in support for describing a process of assembling the female connector that is used in the stator indicated in FIGS. 13 (A) and 13 (B), respectively.

PREFERRED EMBODIMENTS OF THE PRESENT INVENTION

A stator structure of a motor in accordance with an embodiment of the present invention will be described with reference to the accompanying drawings.

First Embodiment

Figure 1:
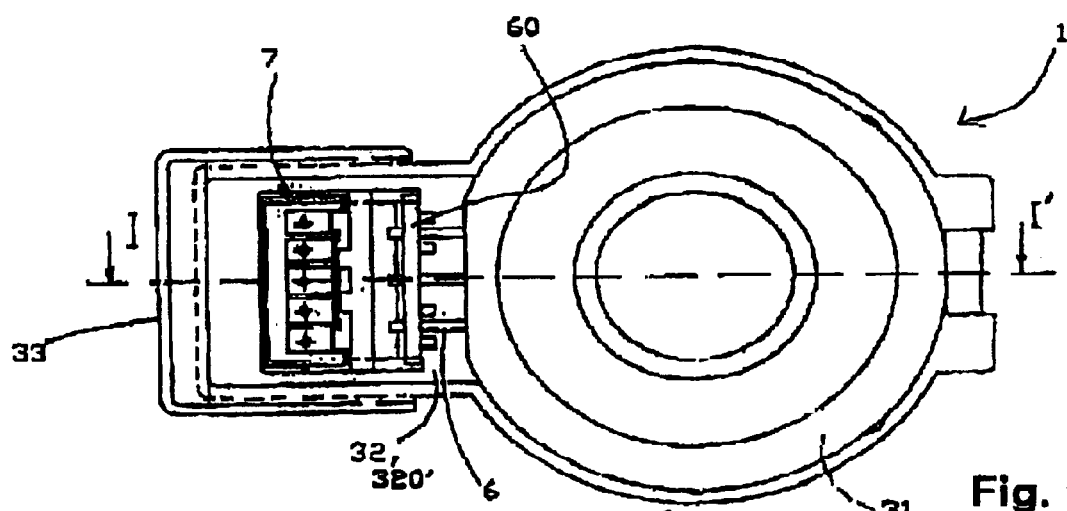
FIGS. 1 (A) and 1 (B) are a plan view of a stator of a motor in accordance with a fist embodiment of the present invention before sealing resin is filled, and a cross-sectional view of the stator taken along a line I–I' in FIG. 1 (A) after the sealing resin is filled, respectively.
Figure 1:
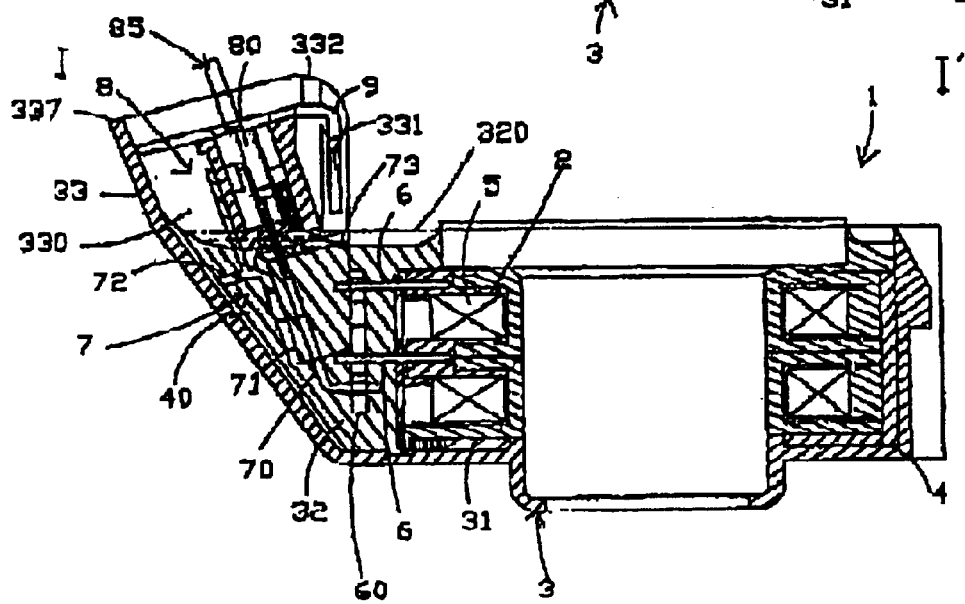
Figure 2:
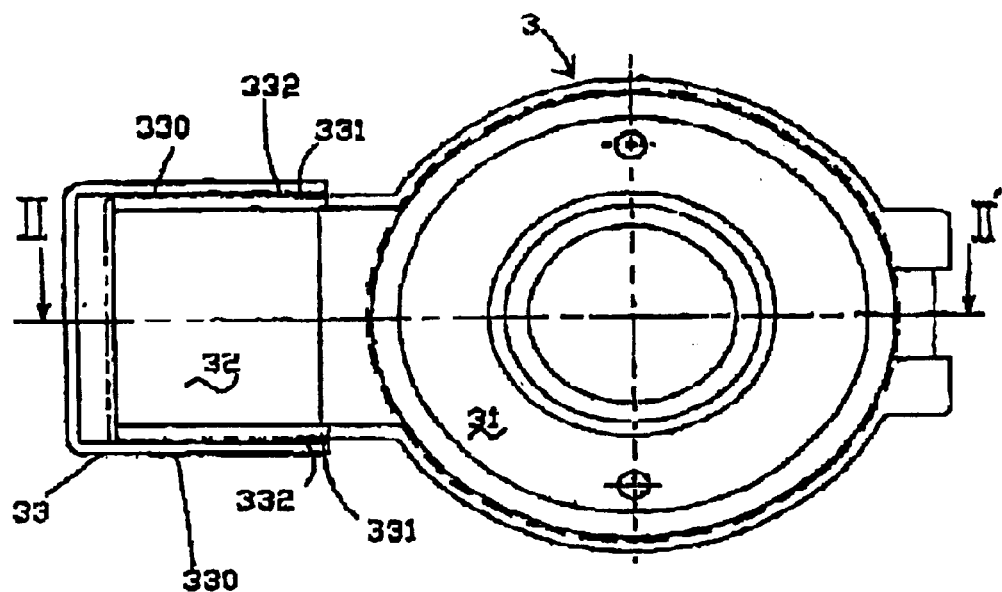
FIGS. 2 (A) and 2 (B) are a plan view of a cover used on the stator indicated in FIGS. 1 (A) and 1 (B), and a cross-sectional view of the cover taken along a line II–II' in FIGS. 1 (A) and 1 (B), respectively.
Figure 2:
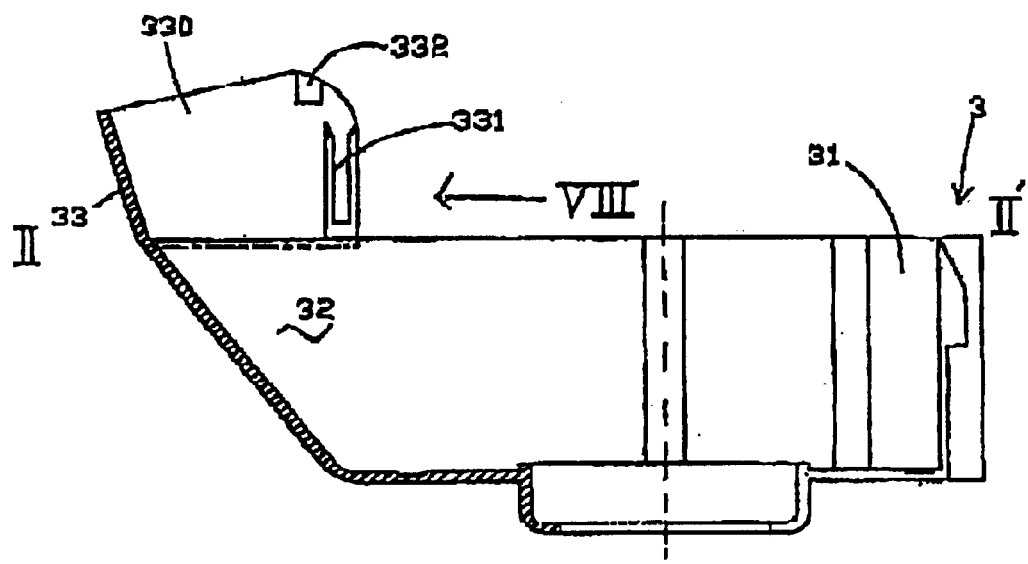
Figure 3:
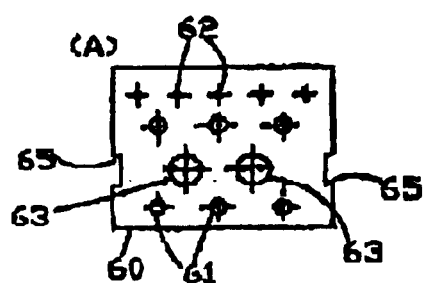
FIGS. 3 (A) and 3 (B) are a plan view and a side view of a substrate used in the stator indicated in FIGS. 1 (A) and 1 (B), respectively.
Figure 3:
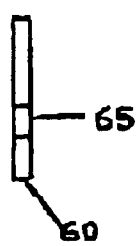
Figure 4:
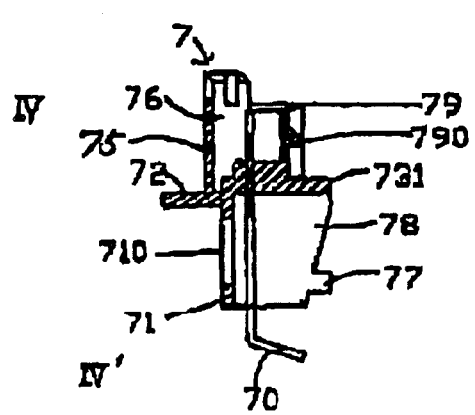
FIGS. 4 (A), 4 (B) and 4 (C) are a front view, a IV–IV' cross-sectional view and a bottom view of a female connector used in the stator indicated in FIGS. 1 (A) and 1 (B), respectively.
Figure 4:
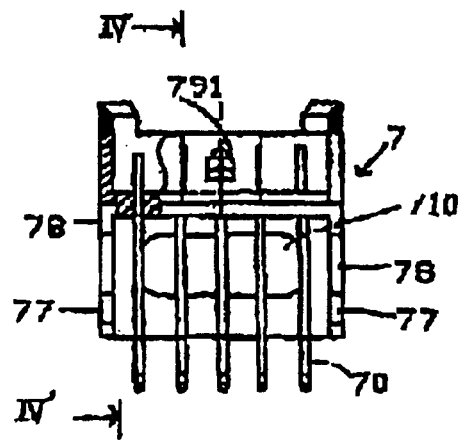
Figure 4:
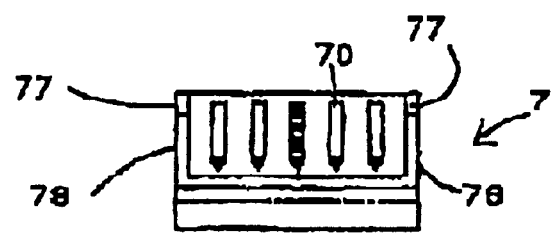
Figure 5:
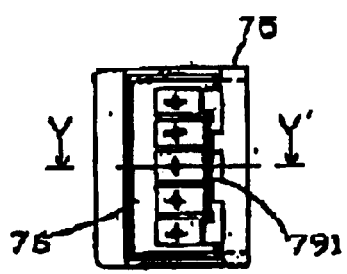
FIGS. 5 (A), 5 (B), 5 (C) and 5 (D) are a plan view, a side view, a V–V' cross-sectional view and a bottom view of a connector housing of the female connector used in the stator indicated FIGS. 1 (A) and 1 (B), respectively.
Figure 5:
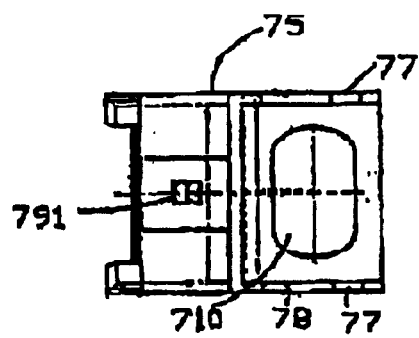
Figure 5:
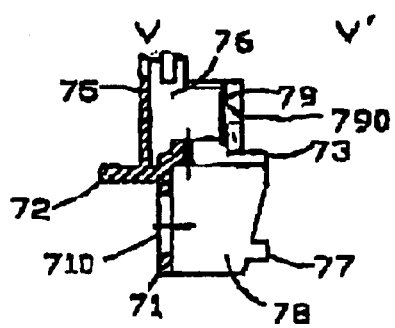
Figure 5:
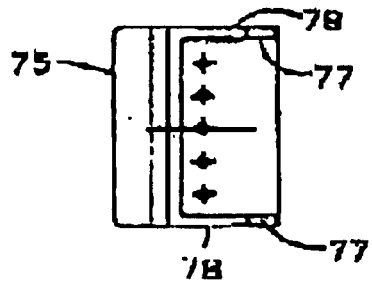
Figure 6:
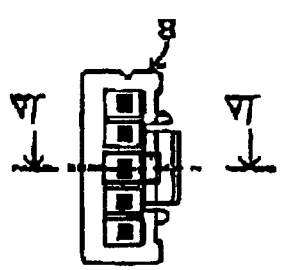
FIGS. 6 (A), 6 (B), 6 (C) and 6 (D) are a plan view, a side view, a bottom view and a VI–VI' cross-sectional view of a male connector 8 used in the stator indicated in FIGS. 1 (A) and 1 (B), respectively.
Figure 6:
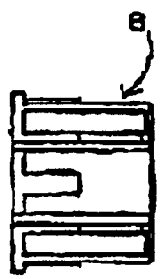
Figure 6:
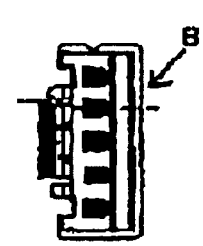
Figure 6:
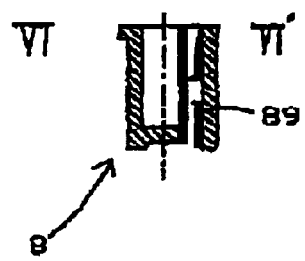
Figure 7:
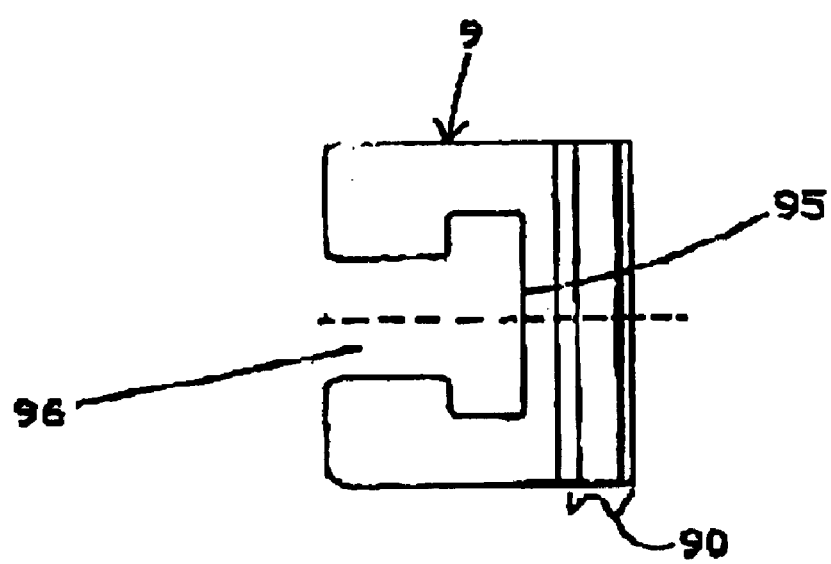
FIGS. 7 (A) and 7 (B) are a plan view and a side view of a lock plate used in the stator indicated in FIGS. 1 (A) and 1 (B), respectively.
Figure 7:
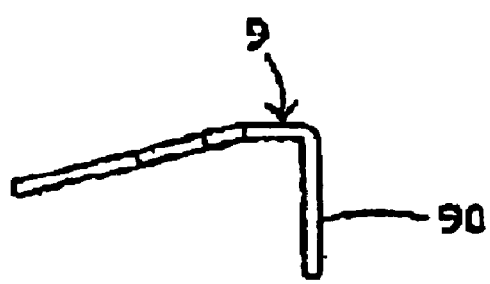
Figure 8:
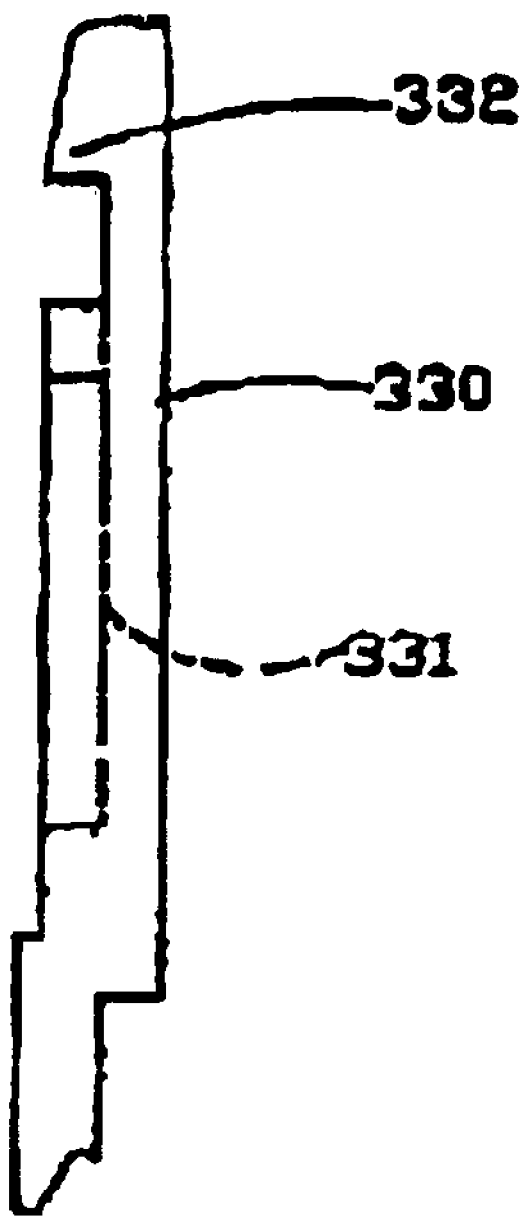
FIG. 8 is a side view viewed in an arrow VIII in FIG. 2.
Figure 9:
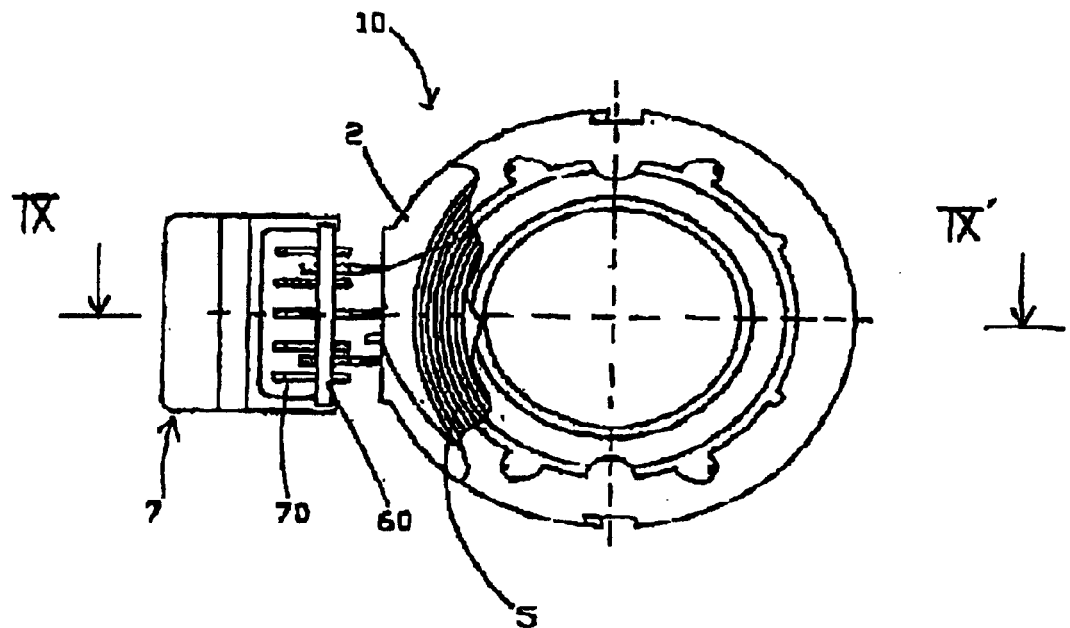
FIGS. 9 (A) and 9 (B) are a bottom view and a IX IX' cross-sectional view of a stator assembly used in the stator indicated in FIGS. 1 (A) and 1 (B), respectively.
Figure 9:
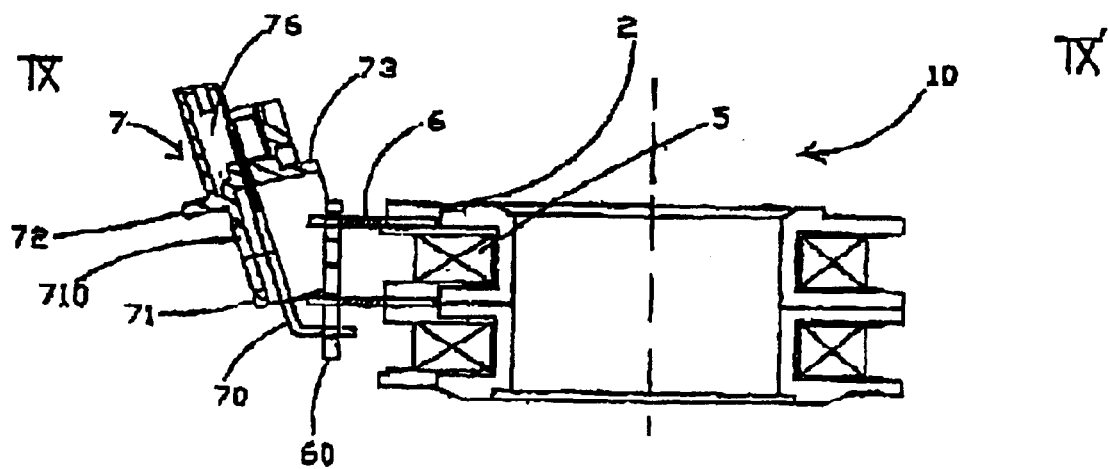

FIGS. 1 (A) and 1 (B) are a plan view of a stator of a motor in accordance with a fist embodiment of the present invention before sealing resin is filled, and a cross-sectional view of the stator taken along a line I–I' in FIG. 1 (A) after the sealing resin is filled, respectively. FIGS. 2 (A) and 2 (B) are a plan view of a cover used on the stator indicated in FIGS. 1 (A) and 1 (B), and a cross-sectional view of the cover taken along a line II–II' in FIGS. 1 (A) and 1 (B), respectively. FIGS. 3 (A) and 3 (B) are a plan view and a side view of a substrate used in the stator indicated in FIGS. 1 (A) and 1 (B), respectively. FIGS. 4 (A), 4 (B) and 4 (C) are a front view, a IV–IV' cross-sectional view and a bottom view of a female connector used in the stator indicated in FIGS. 1 (A) and 1 (B), respectively. FIGS. 5 (A), 5 (B), 5 (C) and 5 (D) are a plan view, a side view, a V–V' cross-sectional view and a bottom view of a connector housing of the female connector used in the stator indicated in FIGS. 1 (A) and 1 (B), respectively. FIGS. 6 (A), 6 (B), 6 (C) and 6 (D) are a plan view, a side view, a bottom view and a VI–VI' cross-sectional view of a male connector 8 used in the stator indicated in FIGS. 1 (A) and 1 (B), respectively. FIGS. 7 (A) and 7 (B) are a plan view and a side view of a lock plate used in the stator indicated in FIGS. 1 (A) and 1 (B), respectively. FIG. 8 is a side view viewed in an arrow VIII in FIG. 2. FIGS. 9 (A) and 9 (B) are a bottom view and a IX–IX' cross-sectional view of a stator assembly used in the stator indicated in FIGS. 1 (A) and 1 (B), respectively.

Referring to FIGS. 1 (A) and 1 (B), the motor of the present embodiment, which is a stepping motor, has a stator 1 with a center hole formed at a center thereof. A rotor (not shown) is disposed in the center hole of the stator 1. The stator 1 includes a resin case 3 (see FIGS. 2 (A) and 2 (B)) that is equipped with a bobbin storage section 31, a resin filling section 32, and a connector protection section 33. One pair of upper and lower coil bobbins 2, which may be made of synthetic resin, are disposed in the bobbin storage section 31 in a manner that the coil bobbins 2 surround the center hole in which the rotor is disposed. The resin filling section 32 is disposed adjacent to the bobbin storage section 31 in a manner that the resin filling section 32 protrudes sideway from the bobbin storage section 31. The rest filling section 32 has an upper section that defines a wide opening. The connector protection section 33 extends upwardly from the resin filling section 32 and is in a generally angled U-channel shape as viewed in plane.

The coil bobbins 2 are stored in the bobbin storage section 31 of the case 3 in a state that an outer circumferential side of the coil bobbins 2 is covered by a motor case 4.

Each of the coil bobbins 2 has a body section, and a coil winding 5 is wound on the body section of the coil bobbin 2. Also, the coil bobbins 2 have thick wall sections, and base sections of multiple terminal pins 6 are affixed to the thick wall sections of the coil bobbins 2. An end section of each of the coil windings is wound on and soldered to each of the terminal pins 6.

Also, a substrate 60 is affixed to the terminal pins 6 at a predetermined position along the length direction of the terminal pins 6. A flexible substrate, a phenol substrate, a glass-epoxy substrate or the like can be used as the substrate 60. In the present embodiment, a substrate having a relatively high rigidity such as a phenol substrate or a glass-epoxy substrate is used.

Sealing resin 40 is injected and filled in the resin filling section 32, such that the entire resin filling section 32 is sealed and fixed with the sealing resin 40, and therefore the substrate 60 and the terminal pins 6 are sealed and fixed by the sealing resin 40.

In the present embodiment, as indicated in FIGS. 3 (A) and 3 (B), the substrate 60 is provided with holes 62 for passing connector pins 70 (to be describe later), as well as two relatively large through holes 62. As a result, in the state indicated in FIGS. 1 (A) and 1 (B), portions of the sealing resin 40 on both sides of the substrate are connected to each other through the through holes 63. In other words, the through holes 63 are effective in filling the sealing resin, such that the sealing resin 40 can be securely charged and filled in every corners of the resin filling section 32. Also, the substrate 60 is securely retained by the sealing resin 40.

Referring back to FIGS. 1 (A) and 1 (B), a female connector member 7 is disposed on the inside of the resin filling section 32 and the connector protection section 33 of the case 3. A lower half section of the female connector member 7 is also sealed and fixed by the sealing resin 40 that is injected and filled in the resin filling section 32.

The female connector member 7, as indicated in FIGS. 4 (A), 4 (B), 4 (C) and 4 (D), includes a connector housing 75 and a plurality of connector pins 70. The connector housing 75 includes a recessed section 76 at its upper half section for receiving a male connector member 8. The plural connector pins 70 are mounted on the connector housing 75.

Lower end sections of the connector pins 70 are soldered to the substrate, and electrically connected to predetermined ones of the terminal pins 6 through a wiring pattern formed on the substrate 60. Accordingly, the lower end sections of the connector pins 70 are also completely sealed by the sealing resin 40 together with the substrate 60 and the terminal pins 6.

For connecting the lower end sections of the connector pins 70 to the substrate 60, as indicated in FIGS. 3 (A) and 3 (B), the substrate 60 is provided with cut sections 65 on opposing sides thereof, and the connector housing 75 includes side plates 78 having engagement protrusions 77 that engage with the cut sections 65 of the substrate 60. As a result, the positioning of the substrate 60 with respect to the connector housing 75 can be securely and firmly accomplished.

Also, the connector housing 75, as indicated in FIGS. 4 (A), 4 (B), 4 (C) and 4 (D) and FIGS. 5 (A), 5 (B), 5 (C) and 5 (D), is equipped in its lower half section with a first embedding section 71 in a plate shape that extends toward the lower end side of the connector pins 70, in other words, on the opposite side of the recessed section 76, and a second embedding section 72 in a plate shape that protrudes sideway from the first embedding section 71. A boundary surface of the sealing resin 40 is located between a side in which the first embedding section 71 and the second embedding section 72 are formed and a side where the recessed section 76 is formed. Accordingly, the male connector member 7 has a relatively large lower half section, and the large lower half section of the male connector 7 is embedded in the sealing resin 40. Also, a relatively large through hole 710 is defined in the first embedding section 71 for charging the sealing resin 40, so that the sealing resin 40 on both sides of the first embedded section 71 is continuous through the through hole 710 in the state indicated in FIGS. 1 (A) and 1 (B).

Furthermore, the connector housing 75 is equipped with a dam section 73 in a plate shape between the first embedding section 71 and the second embedding section 72. The dam section 73 extends from the first embedding section 71 on the opposite side of the second embedding section 72 to prevent the sealing resin 40 from flowing in the recessed section.

The female connector member 7 is disposed in a posture slanted with respect to the inner side of the resin filling section 32 and the connector protection section 33 of the case 3. In this state, on the side where the dam section 73 is formed, the upper surface of the resin filling section 32 is in an open state which defines an upper surface opening 320. Accordingly, the sealing resin 40 can be injected and filled in the resin filling section 32 through the upper surface opening 320 that is in an open state. When filling the sealing resin 40, the level of the sealing resin 40 that is covering the dam section 73 is monitored, and the sealing resin 40 is charged until only an upper end section of the dam section 73 sticks out from the boundary surface of the sealing resin 40. In this manner, the level of the sealing resin 40 is monitored, using the dam section 73 as a reference, and the sealing resin 40 is stopped by the dam section 73. As a result, the sealing resin 40 does not flow into the side of the recessed section 76. For this reason, even when the sealing resin 40 is relatively flowable, the sealing resin 40 does not flow in the recessed section 76, and therefore the inside of the recessed section 76 would not be contaminated by the sealing resin 40.

In a manner described above, the female connector 7 is affixed on the inside of the case 3 to complete the stator 1. When the stator 1 is mounted on a motor equipment, the male connector 8 indicated in FIGS. 6 (A), 6 (B) and 6 (C) is inserted in the recessed section 76, as indicated in FIGS. 1 (A) and 1 (B), and terminals 80 of the male connector 8 contact the connector pins 70 of the female connector 7. Upper half sections of the male connector 8 and the female connector 7 have the same structure as those of general-purpose connectors that may be ordinarily available in the market. More specifically, a protrusion 79 is formed on the female connector 7, and a hook 790 is formed on the protrusion 79. The protrusion 79 can be inserted in a groove 89 of the male connector 8, and the hook 790 engages with the interior of the groove 89 to create a locked state. The locked state can be released by pressing a release protrusion 791 provided on the female connector member 7. As a result, the male connector member 8 can be pulled off the recessed section 76 of the female connector member 7. The lock mechanism described above is not formed with the sealing resin 40, but has a structure and strength that are equivalent to those of a general-purpose connector, and therefore has excellent strength and qualitative stability.

Also, the male connector member 8 is prevented from fall off by a lock plate 9 in an L letter shape (see FIGS. 7 (A) and 7 (B)) that is mounted on the case 3 as a fall-out preventing member, and presses down the male connector 8. More specifically, on a pair of side plates 330 of the connector protection section 38 of the case 3 are formed grooves 331 as shown in an enlarged view of FIG. 8, respectively, and bent sections 90 of the lock plate 9 are inserted in the grooves 331. Also, the pair of side plate sections 330 are provided with protrusions 332 formed thereon, respectively, which hooks on the upper surface of the lock plate 9 in a state in which the bent sections 90 of the lock plate 9 are inserted in the grooves 331.

For this reason, by simply sliding the protrusions 332 into the grooves 331, as indicated in FIG. 1 (B), the lock plate 9 enters the grooves 331 while pushing out the side plate sections 330. In this manner, the lock plate 9 is mounted on the case 3 and covers the male connector member 8. After the lock plate 9 is completely inserted in the grooves 331, the lock plate 9 is pushed from both sides and retained in place by the resilience of the side plate sections 330. Although the lock plate 9 is formed from a thin plate member, the retained state provides the lock plate 9 with a relatively high rigidity. Further, the lock plate 9 would not fall off the case 3 unless its engagement with the protrusions 332 is disengaged.

Also, the lock plate 9 is formed with a rectangular hole 95 for leading out lead wires 85 of the male connector 8 and a relatively wide groove 96 that communicates with the exterior. As a result, even after the lock plate 9 is mounted, the lead wires 85 of the male connector 8 can be lead out without a problem. Also, by simply changing the orientation of the lock plate 9, the lead wires 85 of the male connector 8 can be readily passed into the hole 95.

The lead wires 85 can be bent at a location outside the hole 96 of the lock plate 9. Accordingly, if the hole 95 is formed with a plurality of holes aligned transversely and the lead wires 85 are passed in the holes, the male connector 8 can be prevented from falling off as the bent lead wires 85 limits the movement of the lock plate 9.

In the state in which the lock plate 9 is mounted on the case 3, the female connector 7 and the male connector 8 are surrounded by the connector protection section 33 of the case 3 and the lock plate 9, and the lead wires 85 of the male connector 8 are lead out through the rectangular hole 95 of the lock plate 9.

Also, in this state, the lock plate 9 is located inside an outer peripheral section 337 of the connector protection section 33. For this reason, the outer peripheral section 337 of the connector protection section 33 extends outward from the lock plate 9. Accordingly, when the motor is placed in a state in which the connector section faces downward, water, if any, falling on the bottom section of the case 3 does not reach the connector section because the female connector 7 and the male connector 8 are completely surrounded and covered by the connector protection section 33 of the case 3 and the lock plate 9, and the outer peripheral section 337 of the connector protection section 33 functions as an umbrella.

To manufacture the stator 1 having the structure described above, the connector pins 70 are initially mounted as indicated in FIG. 4 on the connector housing 75 indicated in FIG. 5 to assemble the female connector 7.

Then, as indicated in FIGS. 9 (A) and 9 (B), a jig is used to place the substrate 60 to position the terminal pins 6 at a predetermined height, and the terminal pins 6 and the substrate 60 are soldered together.

Next, the connector pins 70 are inserted in the holes of the substrate 60, and soldered to the substrate 60. At this moment, the protrusions 77 of the connector housing 75 are inserted in the cuts 65 of the substrate 60 to position the substrate 60 with respect to the connector housing 75.

The stator assembly 10 thus assembled is placed together with the motor case 4 inside the case 3, as shown in FIG. 1 (A).

Next, a resin injection nozzle is set at the upper opening section 320 of the resin filling section 32 of the case 3, sealing resin 40 is injected inside the resin filling section 32 while observing the liquid level of the sealing resin 40, and the sealing resin 40 is hardened.

As described above, in the motor of the present embodiment, the stator 1 is composed of the coil bobbins 2 equipped with the terminal pins 6 on which the coil windings 5 are wound, the substrate 60 that is fixed to the terminal pins 6, and the female connector member 7 equipped with the connector pins 70, wherein the a connection section between the substrate 60 and the terminal pins 70, a connection section between the substrate 60 and the connector pins 70, and a part of the connector member 7 are sealed with the sealing resin 40. As a result, even when the connector pins 70 differ in size and structure according to each of motor equipment manufacturers, only the connector pins 70 or the female connector member 7 need to be changed, and the design of the motor main body including the terminal pins 6 and the coil bobbins 2 does not need to be changed.

Also, since the connector pins 70 are provided independently from the terminal pins 6, the following effect is obtained. After the coil windings 5 are wound on the terminal pins 6, and the terminal pins 6 are still separated from the connector pins 70, the terminal pins 6 can be soldered to the coil windings 5 in a solder dip tank or by an automatic soldering apparatus. Accordingly, the solder would not adhere to the connector pins 70 and thus the measurement accuracy would not lower. For this reason, the soldering work on the terminal pins 6 can be automated.

Furthermore, due to the fact that the stator assembly in accordance with the present embodiment is equipped with the connector pins 70 that are provided independently of the terminal pins 6, the terminal pins 6 can be short. Accordingly, no bent or dent occurs in the terminal pins 6. Further, when inserting an assembly of the coil windings with the terminal pins 6 in a metal mold for resin molding, injecting resin in the metal molding (potting), or press-fitting the coil bobbins 2, the terminal pins 6 do not interfere.

Furthermore, due to the fact that the stator structure is provided with the connector members 7 and 8 that are equivalent to general-purpose connectors, the connector housing 75 or the like does not have to be formed with the resin that composes the coil bobbins 2 or the sealing resin 40, and therefore a strong and high performance lock mechanism can be added to the stator structure.

Also, the through hole 710 for charging and filling sealing resin is defined in the first embedding section 71, so that the sealing resin 40 on both sides of the first embedded section 71 is continuous through the through hole 710. As a result, the male connector member 7 is firmly retained by the sealing resin 40. Also, the second embedding section 72 protrudes sideway from the upper end section of the first embedding section 71 perpendicularly with respect to the first embedding section 71. As a result, even when a force is applied to the connector housing 75 in a direction in which it would be pulled out of the sealing resin 40, the connector housing 75 would not be pulled out of the sealing resin 40 because the second embedding section 72 that extends in a direction perpendicular to the direction of the force is completely embedded in the sealing resin 40.

Also, the cover 3 is equipped with the connector protection section 33 that extends from the resin filling section 32 and surrounds the connector housing 75, and the male connector member 8 is covered by the lock plate 9 inside the connector protection section 33. As a result, the connector members are prevented from being disengaged even when some object hits the connection section of the connector members. Also, even in a state in which the connection section of the connector members is disposed facing downward, water such as rain water does not fall on the connection section.

In the embodiment described above, the female connector member 7 is provided on the side of the stator 1, and the male connector member 8 is mounted on the female connector member 7 to supply power from the male connector member 8 to the coils. However, inversely, the connection section may have a structure in which the male connector member 8 is provided on the side of the stator 1, and the female connector member 7 is mounted on the male connector member 8 to supply power from the female connector member 7.

Second Embodiment

Figure 10:
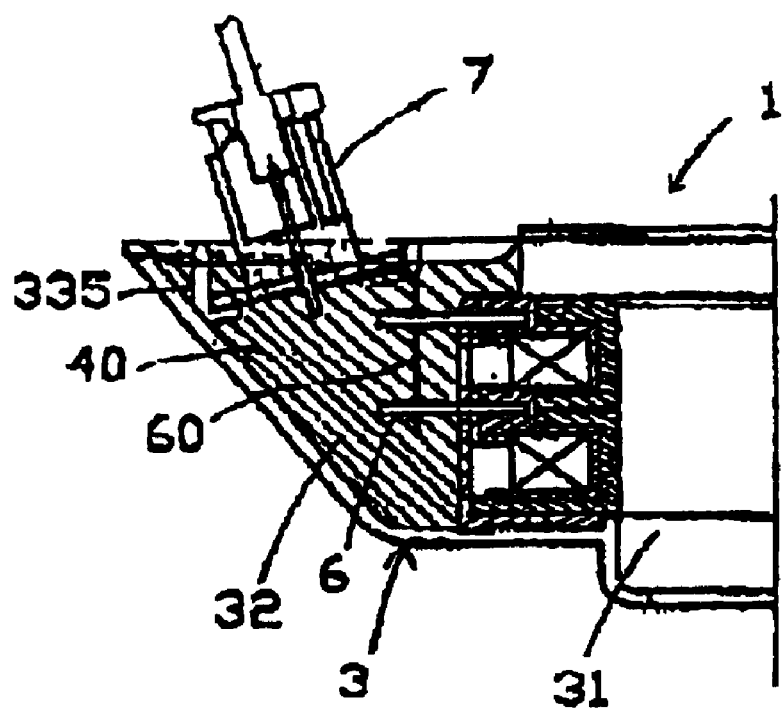
FIG. 10 is a cross-sectional view of a stator of a motor in accordance with a second embodiment of the present invention after sealing resin is filled.
Figure 11:
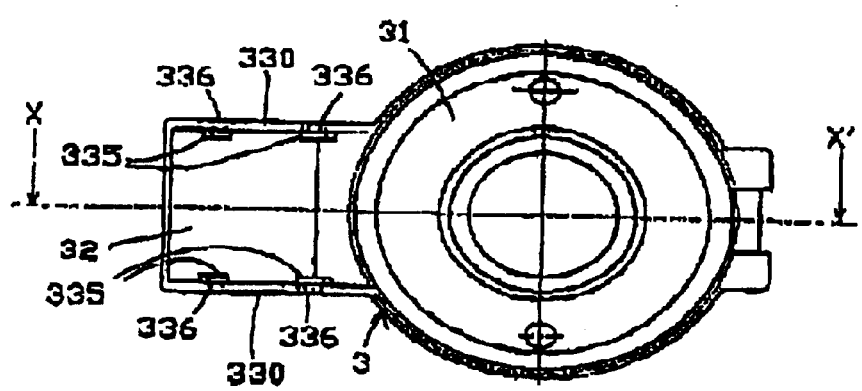
FIGS. 11 (A), 11 (B) and 11 (C) are a plan view and a X–X' cross-sectional view of a cover used in the stator indicated in FIG. 10, and a XI–XI' cross-sectional view of a side plate of the cover, respectively.
Figure 11:
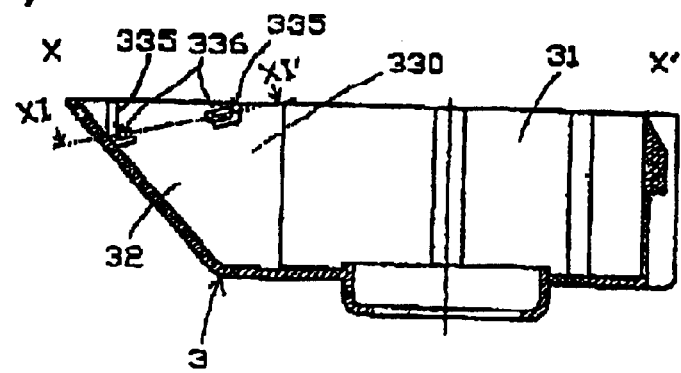
Figure 11:
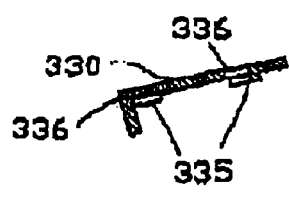
Figure 12:
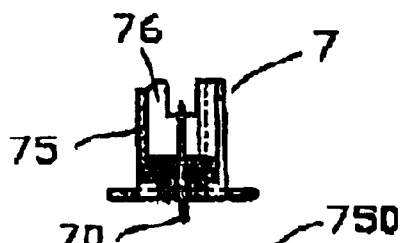
FIGS. 12 (A), 12 (B) and 12 (C) are a plan view, a side view and a VII–VII' cross-sectional view of a female connector used in the stator indicated in FIG. 10, respectively.
Figure 12:
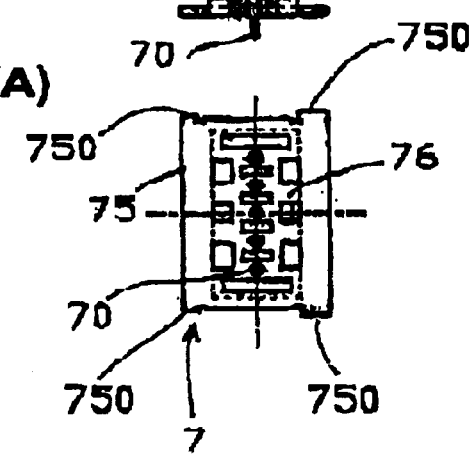
Figure 12:
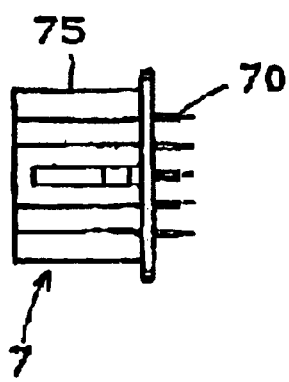

FIG. 10 is a cross-sectional view of a stator of a motor in accordance with a second embodiment of the present invention after sealing resin is filled. FIGS. 11 (A), 11 (B) and 11 (C) are a plan view and a X–X' cross-sectional view of a cover used in the stator indicated in FIG. 10, and a XI–XI' cross-sectional view of a side plate of the cover, respectively. FIGS. 12 (A), 12 (B) and 12 (C) are a plan view, a side view and a VII–VII' cross-sectional view of a female connector used in the stator indicated in FIG. 10, respectively. It is noted that the principle structure of the stator of the second embodiment may be the same as that of the first embodiment. Accordingly, components in the second embodiment having similar or the same functions are assigned the same reference numbers as those of the first embodiment, and only portions of the second embodiment different from the first embodiment will be described.

Referring to FIG. 10, the stator 1 of the present embodiment also includes a resin case 3 (see FIGS. 1 (A) and 1 (B)) that is equipped with a bobbin storage section 31, and a resin filling section 32. The resin filling section 32 has an upper section that widely opens, and is disposed adjacent to the bobbin storage section 31 in a manner that the resin filling section 32 protrudes sideway from the bobbin storage section 31. Also, the coil bobbins 2 have thick wall sections, and base sections of multiple terminal pins 6 are affixed to the thick wall sections of the coil bobbins 2. An end section of each of the coil windings is wound on and soldered to each of the terminal pins 6.

In the present embodiment, a substrate 60 formed form a flexible substrate is affixed to the terminal pins 6 at a predetermined position along the length direction of the terminal pins 6.

The substrate 60 and the terminal pins 6 are sealed and fixed with respect to the resin filling section 32 by the sealing resin 40 that is injected and filled in the resin filling section 32.

Also, a female connector member 7 is disposed adjacent to the opening section of the resin filling section 32, and a lower half section of the female connector member 7 is located inside the resin filling section 32 and fixed in place by the sealing resin 40.

The female connector member 7, as indicated in FIGS. 12 (A), 12 (B) and 12 (C), includes a connector housing 75 and a plurality of connector pins 70. The connector housing 75 includes a recessed section 76 at its upper half section for receiving a male connector member. The plural connector pins 70 are mounted on the connector housing 75.

Lower end sections of the connector pins 70 are soldered to the substrate 60 that is lead from the side of the terminal pins, and electrically connected to predetermined ones of the terminal pins 6 through a wiring pattern formed on the substrate 60. Accordingly, the lower end sections of the connector pins 70 are also completely sealed together with the substrate 60 and the terminal pins 6 by the sealing resin 40.

In the present embodiment, as indicated in FIGS. 11 (A), 11 (B) and 11(C), the case 3 has a pair of opposing side plate portions 330. L-shaped stoppers 335 protrude from the side plate portions 330 to receive the female connector member 7. Also, recessed sections 336 are formed in the side plate portions 330 adjacent to the stoppers 335 for receiving four protrusions 750 of the female connector 7 protruding in both sides thereof.

Other structures are similar to the first embodiment, and therefore their description is omitted.

In the stator 1 having the structure described above, the stoppers 335, the protrusions 750 and the recessed sections 336 define a positioning mechanism. As a result, the female connector member 7 can be positioned in a tilted posture and temporarily fixed in a predetermined position on the inside of the resin filling section 32 of the case 3. The sealing resin 40 can be charged and filled in the resin filling section 32 while the female connector member 7 is in the temporarily fixed state. As a consequence, the stator 1 can be effectively manufactured.

Also, since the female connector member 7 can be temporarily fixed inside the resin filling section 32 of the case 3, the female connector member 7 can be disposed at a predetermined position and in a predetermined posture even when a flexible substrate is used as the substrate 60.

Third Embodiment

Figure 13:
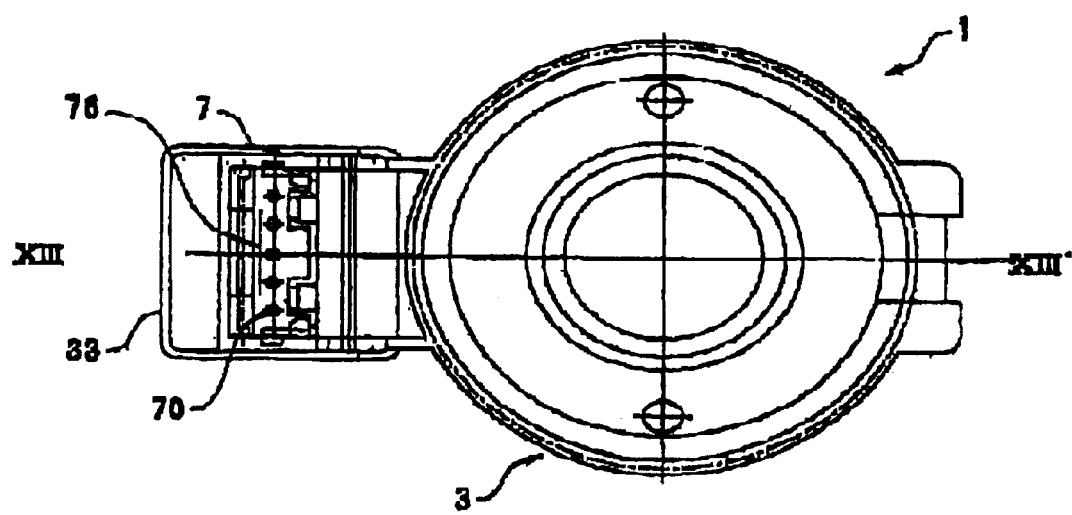
FIGS. 13 (A) and 13 (B) are a plan view of a stator of a motor in accordance with a third embodiment of the present invention after sealing resin is filled, and a XIII XIII' cross-sectional view of the stator, respectively.
Figure 13:
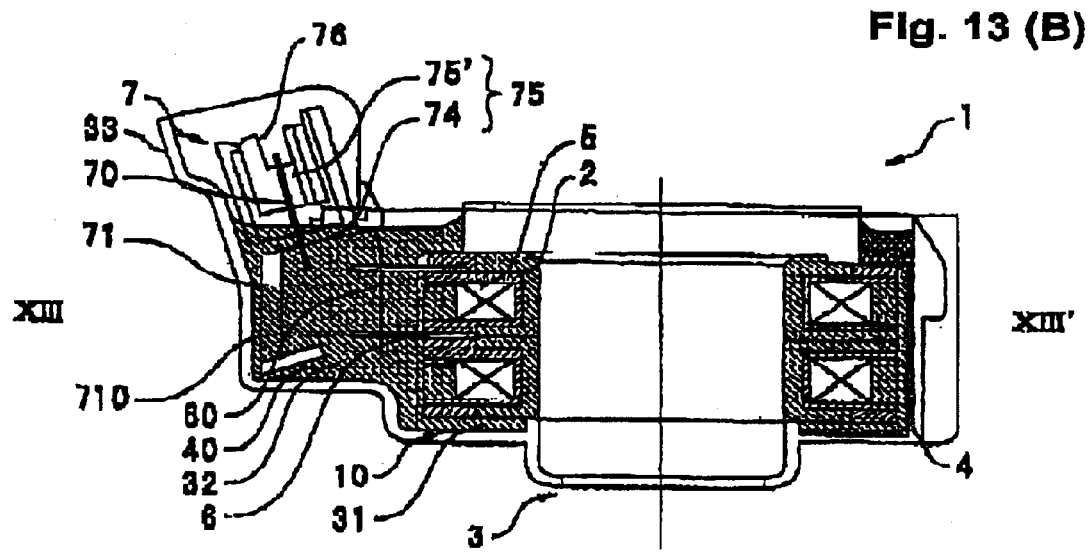
Figure 14:
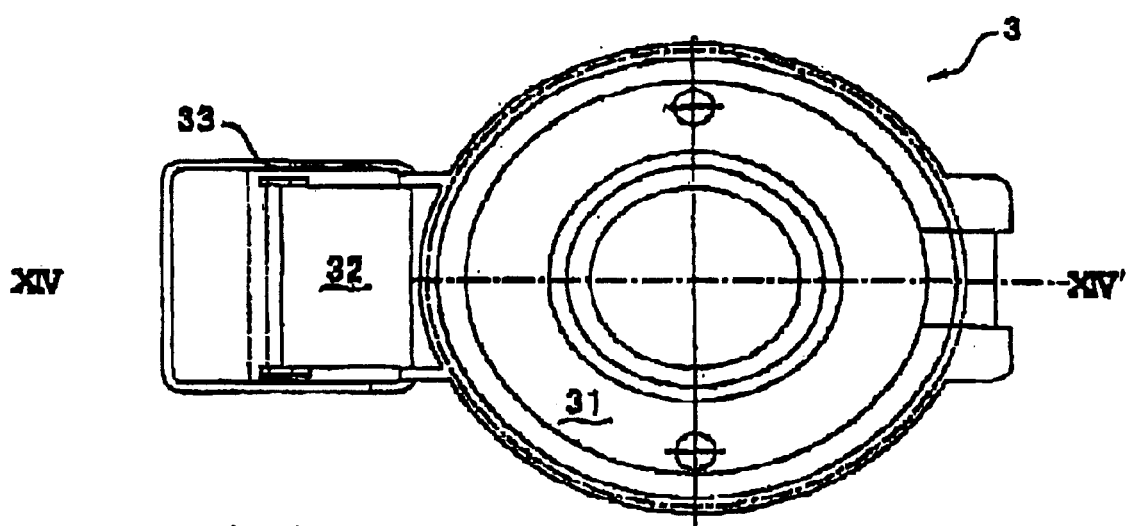
FIGS. 14 (A) and 14 (B) are a plan view of a cover used on the stator indicated in FIGS. 13 (A) and 13 (B), and a XIV–XIV' cross-sectional view of the cover in FIGS. 13 (A) and 13 (B), respectively.
Figure 14:
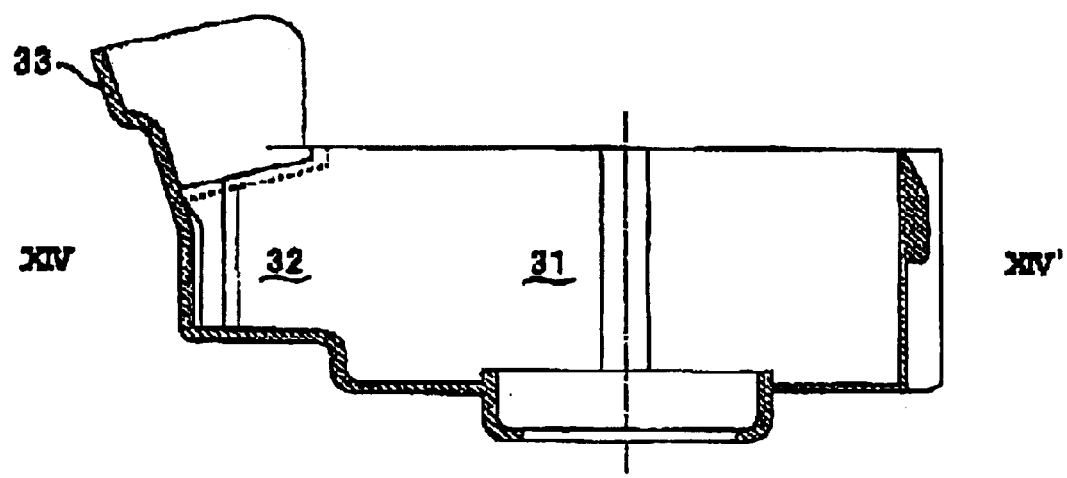
Figure 15:
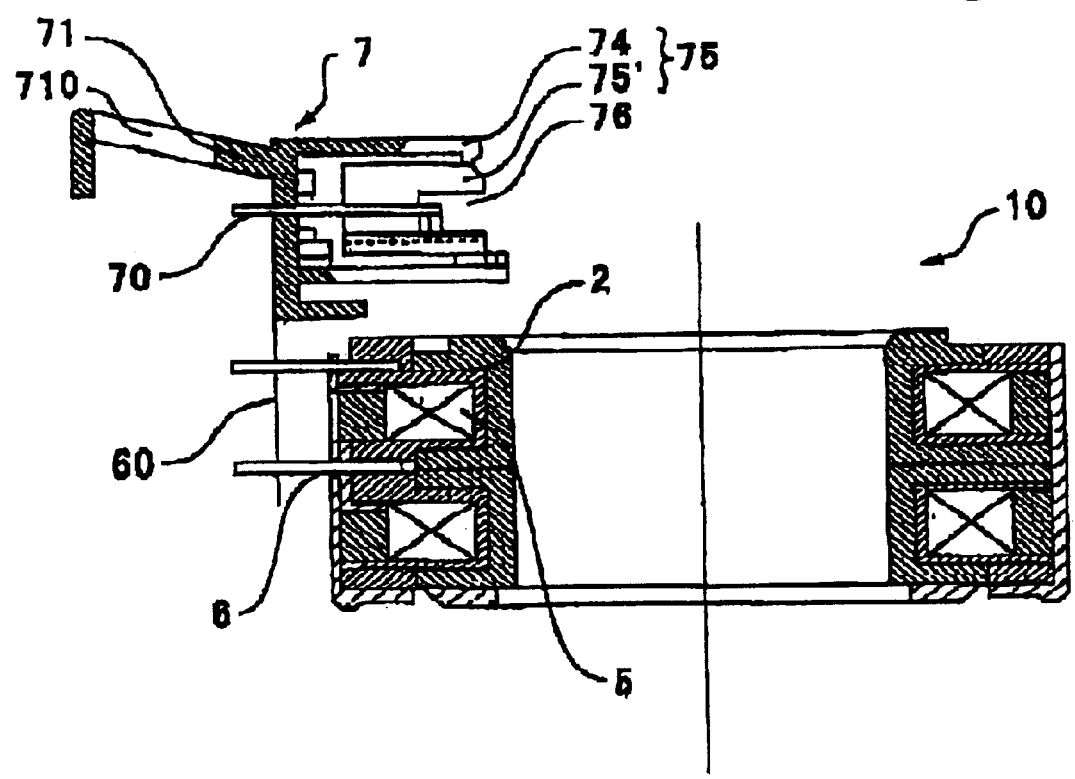
FIG. 15 is a cross-sectional view of a stator assembly of the stator indicated in FIGS. 13 (A) and 13 (B) before being mounted in the case and sealed.
Figure 16:
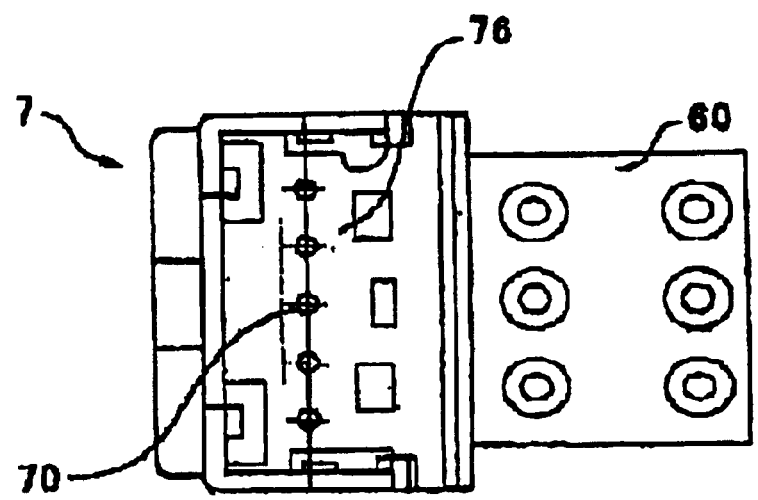
FIGS. 16 (A) and 16 (B) are a plan view and a cross-sectional view of a structure in which a substrate is connected to the female connector used in the stator indicated in FIGS. 13 (A) and 13 (B), respectively.
Figure 16:
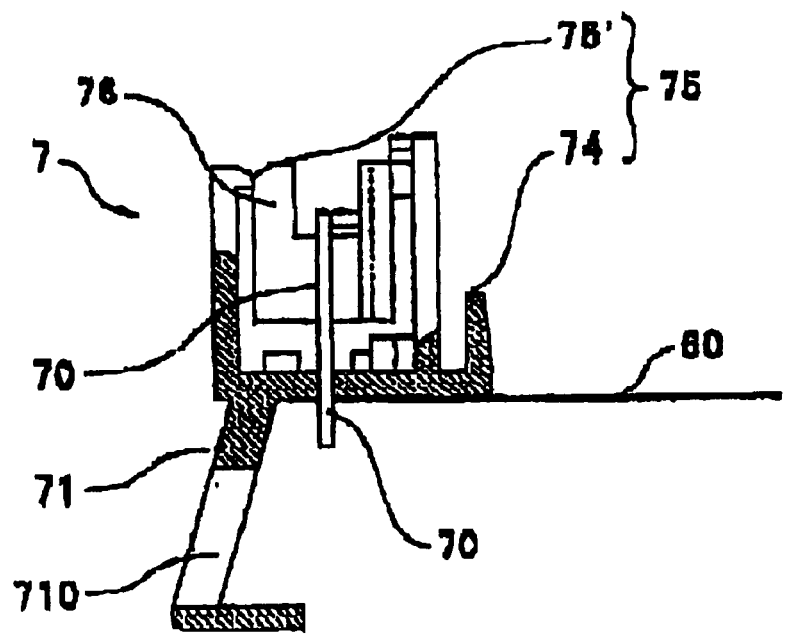

FIGS. 13 (A) and 13 (B) are a plan view of a stator of a motor in accordance with a third embodiment of the present invention after sealing resin is filled, and a XIII–XIII' cross-sectional view of the stator, respectively. FIGS. 14 (A) and 14 (B) are a plan view of a cover used on the stator indicated in FIGS. 13 (A) and 13 (B), and a XIV–XIV' cross-sectional view of the cover in FIGS. 13 (A) and 13 (B), respectively. FIG. 15 is a cross-sectional view of a stator assembly of the stator indicated in FIGS. 13 (A) and 13 (B) before being mounted in the case and sealed. FIGS. 16 (A) and 16 (B) are a plan view and a cross-sectional view of a structure in which a substrate is connected to the female connector used in the stator indicated in FIGS. 13 (A) and 13 (B), respectively. FIGS. 17 (A), 17 (B), 17 (C), 17 (D) and 17 (E) show cross-sectional views in support for describing a process of assembling the female connector that is used in the stator indicated in FIGS. 13 (A) and 13 (B), respectively.

Referring to FIGS. 13 (A) and 13 (B), the motor of the present embodiment, which is also a stopping motor, has a stator 1 with a hole formed at a center thereof. A rotor (not shown) is disposed in the center hole of the stator 1. The stator 1 includes a resin case 3 (see FIGS. 14 (A) and 14 (B)) that is equipped with a bobbin storage section 31, a resin filling section 32, and a connector protection section 33. One pair of upper and lower coil bobbins 2, which may be made of synthetic resin, are disposed in the bobbin storage section 31 in a manner that the coil bobbins 2 surround the center hole in which the rotor is disposed. The resin filling section 32 has an upper section that widely opens and is disposed adjacent to the bobbin storage section 31 in a manner that the resin filling section 32 protrudes sideway from the bobbin storage section 31. The connector protection section 33 extends upwardly from the resin filling section 32 and is in a generally angled U-channel shape as viewed in plane.

The coil bobbins 2 are covered on their outer circumferential sides by a metal motor case 4 and stored in the bobbin storage section 31 of the case 3.

Each of the coil bobbins 2 has a body section, and a coil winding 5 is wound on the body section of the coil bobbin 2. Also, the coil bobbins 2 have thick wall sections and base sections of multiple terminal pins 6 are affixed to the thick wall sections of the coil bobbins 2. An end section of each of the coil windings is wound on and soldered to each of the terminal pin 6.

A substrate 60 is affixed to the terminal pins 6 at a predetermined position along the length direction of the terminal pins 6. The substrate 60 in accordance with the present embodiment is formed form a flexible substrate.

The substrate 60 and the terminal pins 6 are sealed and fixed in place by the sealing resin 40 that is injected and filled in the resin filling section 32.

Also, a female connector member 7 is disposed on the inside of the resin filling section 32 and the connector protection section 33 of the case 3, and a lower half section of the female connector member 7 is sealed and fixed in place by the sealing resin 40 that is injected and filled in the resin filling section 32.

As indicated in FIG. 15 and FIGS. 16 (A) and 16 (B), the female connector member 7 has a recessed section 76 that receives a male connector and a plurality of connector pins 70 inside the recessed section 76. Lower end sections of the connector pins 70 are soldered to the substrate 60, and electrically connected to predetermined ones of the terminal pins 6 through a wiring pattern formed on the substrate 60. Accordingly, the lower end sections of the connector pins 70 are also completely sealed by the sealing resin 40 together with the substrate 60 and the terminal pins 6.

The male connector member 7 in accordance with the present embodiment includes a connector housing 75. The connector housing 75 includes a female connector 75' equipped with a recessed section 76 and connector pins 70, and a connector holder 74 that retains the female connector 75 on the inside thereof. The female connector 75' may be a general-purpose connector, and the connector pins 70 are affixed to the bottom section of the recessed section 76.

The connector housing 74 of the female connector member 7 is equipped with a plate-shaped embedding section 71 that extends downward and diagonally in an L-letter shape. The boundary surface of the sealing resin 40 is located between the side where the embedding section 71 is formed and the side where the recessed section 76 is formed. Also, a relatively large through hole 710 is formed in the embedding section 71. In a state indicated in FIGS. 13 (A) and 13

(B), portions of the sealing resin 40 on both sides of the embedding section 71 are connected with each other through the through hole 710.

When the stator 1 having the structure described above is composed, the female connector 75' and the connector holder 74 that may be available in the market are connected to each other to compose the connector housing 75 and the female connector member 7.

As indicated in FIG. 17 (A), the female connector 75' includes a pair of opposing side wall sections 751 respectively having recessed sections 752 that are cut. The connector holder 74 includes a pair of opposing side wall sections 740, first protrusions 741 formed on inner surfaces of the side wall sections 740 at locations relatively close to upper ends of the side wall sections 740, and second protrusions 742 protruding inward at locations at the upper ends of the side wall sections 740.

As indicated in FIGS. 17 (B), 17 (C) and 17 (D), the female connector 75' is held tilted and is pushed into the space surrounded by the side wall sections 740 of the connector holder 74 while pushing the side wall sections 740 outwardly. Then, as indicated in FIG. 17 (E), as lower end sections of the connector pins 70 are completely inserted in the holes 745 formed at the bottom section of the connector holder 75', the female connector 75' is stored inside the connector holder 74. At this moment, the side wall sections 740 of the connector holder 74 pinch the female connector 75' from outer sides with their resilient returning force. As a result, the first protrusions 741 of the connector holder 74 enter the recessed sections 752 of the female connector 75', and the second protrusions 742 of the connector holder 74 are hooked at the upper end section of the female connector 75', such that the female connector 75' is retained by the connector holder 74.

After the connector housing 75 and the female connector member 7 are assembled in a manner described above, the substrate 60 is soldered to the lower end sections of the connector pins 70, as indicated in FIGS. 16 (A) and 16 (B); and then, the substrate 60 is soldered to the terminal pins 6 of the stator assembly 10, as indicated in FIG. 15.

Thereafter, the stator assembly 10 is stored inside the case 3, and sealed with the sealing resin 40, like the first embodiment.

In accordance with the present embodiment, since the female connector 75', which is ordinarily available in the market, is used in the connector housing 7 of the female connector 7, a general-purpose connector ordinarily available in the market can also be used as a male connector. Therefore the second embodiment can accommodate a variety of specifications at low costs, and motors can be manufactured with lower costs compared to the first embodiment. Also, due to the fact that general-purpose connectors ordinarily available in the market can be used as the female connector 75' and the male connector, the stator structure in accordance with the present embodiment is highly reliable in terms of the tensile strength.

As described above, in accordance with the embodiments of the present invention, a stator structure of a motor includes a stator assembly having a coil bobbin equipped with terminal pins on which coil windings are wound, a substrate that is affixed to the terminal pins, and a connector member that is equipped with connector pins. In one aspect, a connection section between the substrate and the terminal pins, a connection section between the substrate and the connector pins, and a part of the connector member are sealed with sealing resin. As a result, when the connector pins differ in size and structure for each of the manufacturers, only the connector pins need to be changed, and the design of the terminal pins and stator assembly having a coil bobbin does not have to be changed. Also, the connector pins that are provided independently from the terminal pins provide the following advantage. When coil windings are wound on the terminal pins, and the terminal pins are still separated from the connector pins, the terminal pins can be soldered to the coil windings in a solder dip tank or by an automatic soldering apparatus. Accordingly, the solder would not adhere to the connector pins and the measurement accuracy would not lower. For this reason, the soldering work to be performed on the terminal pins can be automated. Furthermore, due to the fact that the stator structure in accordance with the present embodiment is equipped with the connector pins that are provided independently of the terminal pins, the terminal pins can be short. Accordingly, no bent or dent occurs in the terminal pins. Further, when inserting an assembly of coil windings with the terminal pins in a metal mold for resin molding, when injecting resin in the metal molding (potting), or when press-fitting coil bobbins, the terminal pins do not interfere. Furthermore, due to the fact that the stator structure is provided with the connector members, a connector housing or the like does not have to be formed with resin that composes coil bobbins or sealing resin, and therefore a strong and high performance lock mechanism can be provided to the stator structure.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A stator structure of a motor, comprising:
   a stator assembly having a coil bobbin on which coil windings are wound;
   terminal pins affixed to the coil bobbin;
   a substrate that is affixed to the terminal pins, the substrate having a wiring pattern; and
   a connector member that is equipped with connector pins for supplying external power, the connector member being independent of the terminal pins, and wherein the connector member is a female connector that is equipped with a connector housing formed with a recessed sections;
   wherein, at least a connection section between the substrate and the terminal pins, a connection section between the substrate and the connector pins, and a part of the connector member are sealed with sealing resin.

2. A stator structure according to claim 1, wherein the connector pins of the connector member are electrically connected through the wiring pattern on the substrate to the terminal pins.

3. A stator structure according to claim 2, wherein the connector pins of the connector member are electrically connected to the wiring pattern on the substrate at a connection section this is embedded in the sealing resin.

4. A stator structure according to claim 1, wherein the connector pins of the connector member are electrically connected to the wiring pattern on the substrate at a first connection section, the terminal pins are electrically connected to the wiring pattern on the substrate at a second connection section, and the connector pins and the terminal pins are electrically connected via the wiring pattern on the substrate, wherein the first connection section and the second connection section are embedded in the sealing resin.

5. A stator structure according to claim 1, wherein at least one through hole is provided in the substrate for filling sealing resin.

6. A stator structure according to claim 5, wherein portions of the sealing resin provided on both sides of the substrate are mutually connected through the through hole.

7. A stator structure according to claim 1, wherein the recessed section of the connector housing receives a male connector member.

8. A stator structure according to claim 1, wherein the connector housing is equipped with an embedding section that extends in an opposite direction of the recessed section, and is embedded in the sealing resin.

9. A stator structure according to claim 1, wherein the connector housing is equipped with a female connector that is affixed to the connector pins at a bottom section of the recessed section and a connector holder that retains the female connector, wherein the embedding section is formed in the connector holder.

10. A stator structure according to claim 1, wherein the embedding section includes at least one through hole for charging the sealing resin.

11. A stator structure according to claim 1, wherein a boundary surface of the sealing resin is located between the embedding section and the recessed section.

12. A stator structure according to claim 1, wherein the connector housing includes a dam section between the embedding section and the recessed section for preventing the sealing resin from flowing into the recessed section.

13. A stator structure according to claim 1, wherein the connector housing includes an engagement section that engages with the substrate.

14. A stator structure according to claim 13, wherein the engagement section positions the connector housing at a predetermined position with to the substrate.

15. A stator structure according to claim 1, further comprising a cover that includes a bobbin storing section that receives the stator assembly having a coil bobbin, and a resin filling section adjacent to the bobbin storing section, wherein the resin filling section is filled with the sealing resin in a state in which the cover stores at least a part of the substrate and the connector member.

16. A stator structure according to claim 15, wherein the cover is equipped with a connector protection section that extends from the resin filling section and encircles the connector housing.

17. A stator structure according of a motor comprising:
a stator assembly having a coil bobbin on which coil windings are wound;
terminal pins affixed to the coil bobbin;
a substrate that is affixed to the terminal pins, the substrate having a wiring pattern;
a connector member that is equipped with connector pins for supplying external power, the connector member being independent of the terminal pins, wherein at least a connection section between the substrate and the terminal pins, a connection section between the substrate and the connector pins, and a part of the connector member are sealed with sealing resin; and
a cover having a bobbin storing section that stores the stator assembly having a coil bobbin, wherein the cover includes a resin filling section adjacent to the bobbin storing section, and the resin filling section is filled with the sealing resin in a state where the cover stores at least a part of the substrate and the connector member, wherein the resin filling section and the connector member are provided with a positioning mechanism that fixes the connector member at a predetermined position within the resin filling section.

18. A stator structure according to claim 17, wherein the resin filling section of the cover protrudes from the bobbin storing structure and has an upper surface that defines an opening section, and the connector member is affixed to the opening section of the resin filling section.

19. A stator structure according to claim 18, wherein the sealing resin that fills the resin filling section seals a lower side of the connector member and a side of the bobbin storing section.

20. A stator structure according to claim 19, wherein the cover is provided with a connector protection section extending upward from the resin filling section and having a generally U shape cross section as viewed in plane.

21. A stator structure according to claim 19, wherein the connector member is equipped with a connector housing having a recessed section formed therein in which one of the male connector member and the female connector member is inserted, and the connector housing is equipped with an embedding section that extends in an opposite direction of the recessed section and is embedded by the sealing resin.

* * * * *